United States Patent
Arai et al.

(10) Patent No.: US 6,528,202 B1
(45) Date of Patent: Mar. 4, 2003

(54) SAFETY VENT DEVICE USED IN A BATTERY MODULE

(75) Inventors: Naoto Arai, Kosai (JP); Mitsugu Takaki, Toyohashi (JP); Izumi Yamamura, Toyohashi (JP); Shinji Hamada, Toyohashi (JP); Munehisa Ikoma, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 160 days.

(21) Appl. No.: 09/684,420

(22) Filed: Oct. 6, 2000

(30) Foreign Application Priority Data

Oct. 8, 1999 (JP) .......................................... 11-288798

(51) Int. Cl.$^7$ ............................................... H01M 2/12
(52) U.S. Cl. .......................................................... 429/54
(58) Field of Search .................................... 429/53–55

(56) References Cited

U.S. PATENT DOCUMENTS 4,532,705 A    8/1985  Zupancic et al.
5,554,455 A  * 9/1996  Inoue et al. ................... 429/53

FOREIGN PATENT DOCUMENTS

| DE | 8534913 | 3/1986 |
|----|---------|--------|
| EP | 0669663 | 8/1995 |
| EP | 0771037 | 5/1997 |
| EP | 0962993 | 12/1999 |
| EP | 1150365 | 10/2001 |
| JP | 63-175330 | 7/1988 |
| JP | 5-190163 | 7/1993 |
| JP | 6-5274 | 1/1994 |
| JP | 07-161377 | 6/1995 |
| JP | 8-31398 | 2/1996 |
| JP | 9-161755 | 6/1997 |
| WO | WO9831059 | 7/1998 |
| WO | WO9921236 | 4/1999 |

* cited by examiner

*Primary Examiner*—Carol Chaney
*Assistant Examiner*—Susy Tsang-Foster
(74) *Attorney, Agent, or Firm*—Jordan and Hamburg LLP

(57) ABSTRACT

A sealed rechargeable battery module wherein a safety vent device is provided to release the internal pressure of the battery when the pressure has reached a predetermined value. The safety vent device includes a valve case formed with a vent and a sealing protrusion surrounding this vent. A valve body inserted in the valve case includes a sealing portion that is brought in tight contact with the sealing protrusion, a rigid holder for supporting the sealing portion, and a resilient portion for pressing the rigid holder toward the vent. A valve cover is formed with apertures for closing the upper open end of the valve case. In a state, the resilient portion of the valve body is compressed.

23 Claims, 5 Drawing Sheets

SAFETY VENT DEVICE USED IN A BATTERY MODULE

BACKGROUND OF THE INVENTION

The present invention relates to an improved safety vent device provided in a battery module, that is constructed with a plurality of sealed rechargeable battery cells, for releasing pressure when the internal pressure of the rechargeable battery cells has reached a predetermined value.

Alkaline rechargeable batteries such as nickel metal hydride batteries are superior in energy density and have been used in recent years for the power source of electric vehicles. Such mobile power source is normally sealed tightly so as to be maintenance-free. Another feature of the rechargeable battery used in such mobile power source is that it is essential to ensure the safety and reliability of the battery because of the requirements for high capacities. There is accordingly a need for an improved safety vent structure for releasing pressure when the internal pressure of the batteries reaches a certain value, that operates accurately and reliably.

FIG. 5 shows a known safety vent structure applied in a conventional battery module comprising a plurality of sealed rechargeable battery cells. A valve case 41 is formed with a vent 42 in the center in the bottom face thereof, and closed tightly with a valve cap 43, in which a release aperture 44 is formed at the outer periphery on the upper edge thereof. A valve body 45 made of a resilient material such as rubber is arranged within the space enclosed by the valve case 41 and the valve cap 43 in a compressed state.

Japanese Laid-Open Patent Application No. 8-31398 proposes another vent structure, as shown in FIG. 6, wherein a valve case 51 is formed with a vent 52 in its bottom, and an annular sealing projection 53 surrounding the vent 52. The valve case 51 is closed by a valve cover 54 formed with a discharge port 55. A valve body 56 having a seal 57 in tight contact with the annular sealing projection 53, and a spring 58 inserted between the valve body 56 and the valve case 54 for pressing the valve body 56 towards the vent 52, are arranged within the space defined by the valve case 51 and the valve cover 54.

With the safety vent structure shown in FIG. 5, there are variations in the pressure at which the valve body 45 operates, because the valve body 45 makes surface contact with the bottom of the valve case 41 and thereby seals the vent 42 with a surface. It is difficult to control the deformation of the valve body 45 because the valve body 45 is an integral body made of a resilient material such as rubber that has both functions of producing a pressing force and of providing a seal. Therefore, the pressure at which the valve body 45 operates can hardly be set suitably. Moreover, under high temperatures, the rubber-made valve body 45 expands, whereupon the contact area between the valve body 45 and the valve case 41 or valve cap 43 increases. Then the aforementioned pressure at which the valve body 45 operates is accordingly raised.

While the safety vent structure shown in FIG. 6 resolves such problems as described above, it has different drawbacks. That is, since the valve body 56 is pressed against the vent 52 with the spring 58, it is difficult to cause the pressing force of the spring 58 to act accurately and uniformly on the entire periphery of the annular sealing projection 53, and the pressure at which the valve body 56 operates cannot be made constant. In order to provide countermeasures against this problem, a complex structure will be necessary, leading to increase in the number of components and costs. Moreover, there is the problem that the valve body 56 does not always stay concentric with the valve case 51 and part of it collides with the inner wall of the valve case 51, and friction thus generated between the valve body 56 and the valve case 51 may cause unstable operation of the safety vent structure.

SUMMARY OF THE INVENTION

In view of these problems of the prior art, it is an object of the present invention to provide an improved safety vent device for a battery module comprising a plurality of sealed rechargeable batteries, that can operate reliably and stably. Specifically, it is an object of the present invention to provide a safety vent device wherein there is less variance in the pressure at which it operates, the pressing force exerted to a valve body toward a vent for providing a seal around the vent can be made uniform, and the valve body can be restricted to be concentric with a valve case, so that the safety vent device can operate suitably even under high temperatures. Furthermore, the present invention aims at providing a safety vent device that can be constructed with a reduced number of components and with a simple configuration, and manufactured at low cost.

To achieve the above object, a sealed rechargeable battery according to the present invention is provided with a safety vent device, comprising:

- a vent that communicates with the interior of the rechargeable battery;
- a sealing protrusion formed around said vent; and
- a valve body for closing the vent, including a sealing portion that is in tight contact with the sealing protrusion, a rigid holder for supporting said sealing portion, and a resilient portion for pressing said rigid holder towards said vent.

With this construction, deformation of the sealing portion can be restricted and the pressure at which the vent device operates can be made constant, because the sealing portion is supported by the rigid holder and pressed against the sealing protrusion, with which it makes line contact. Moreover, since the rigid holder is biased with the resilient portion, the pressing force can be applied on the entire surface of the sealing portion uniformly, thereby evening the sealing pressure around the entire circumference. Thus, with such a simple and inexpensive structure, the vent device can operate appropriately and stably.

The safety vent device according to the present invention is basically comprised of three components, that is, a valve case in which the vent and the sealing protrusion are formed, a valve body housed in the valve case, and a valve cover formed with apertures for closing the valve case. Thus the safety vent device of the present invention can be manufactured with a reduced number of components and with a simple construction at low cost.

The safety vent device of the present invention can be favorably applied in a sealed rechargeable battery, for releasing pressure when the pressure inside the battery has reached a predetermined value.

If the rigid holder is formed with a connection hole, and the sealing portion and the resilient portion are formed integral with each other, being passed through said connection hole in the rigid holder, the vent body can be constructed of a single component obtained through a single manufacturing process, whereby the structure of the vent device can be further simplified and the cost further reduced. In this case also, it is of course possible to use different rubber-like materials for the sealing portion and the resilient portion, respectively.

If the resilient portion has a height substantially equal to or more than its dimension in a radial direction, variations in the compression of the resilient member can be readily accommodated, whereby application of the pressing force can be further stabilized, and the variation in the pressure at which the vent device operates further reduced.

If, in a state wherein there is a gap between the outer circumferential surface of the rigid holder and the inner circumferential surface of the valve case, the valve body is positioned concentric with the valve case, with part of the outer circumferential surface of the rigid holder being engaged with the inner circumferential surface of the valve case, then the valve case and the valve body are prevented from colliding with each other, and the pressure at which the vent device operates can be made constant even at high temperatures, when the rubber-made valve body tends to expand.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF PREFERRED EMBODIMENTS

One embodiment of a sealed rechargeable battery provided with a safety vent device according to the present invention will be hereinafter described with reference to FIG. 1 to FIG. 4.

Figures 1A, 1B:
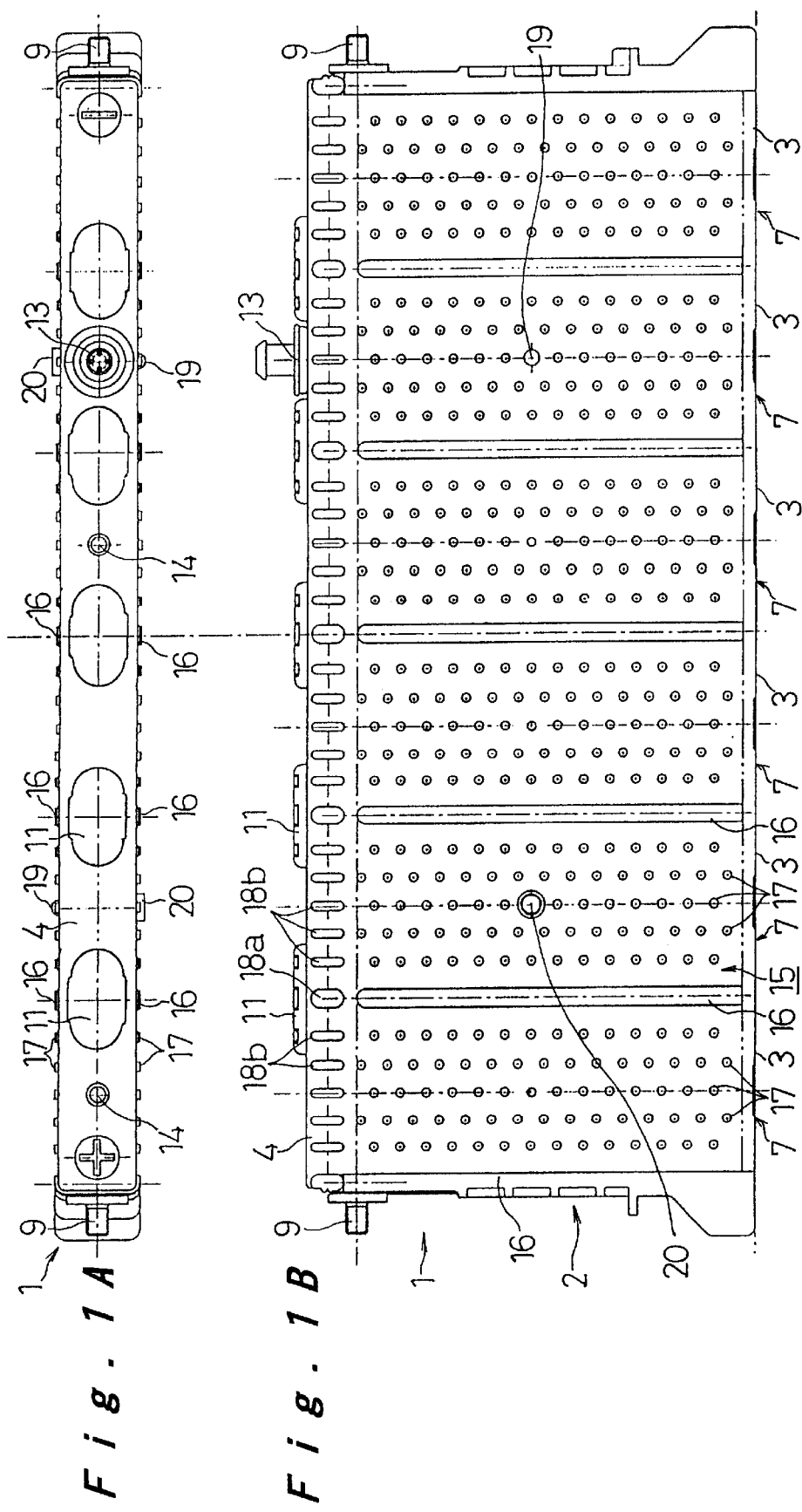
FIG. 1A is a top plan view and FIG. 1B is a front view showing a battery module in which a safety vent device according to one embodiment of the present invention is applied.
Figure 2:
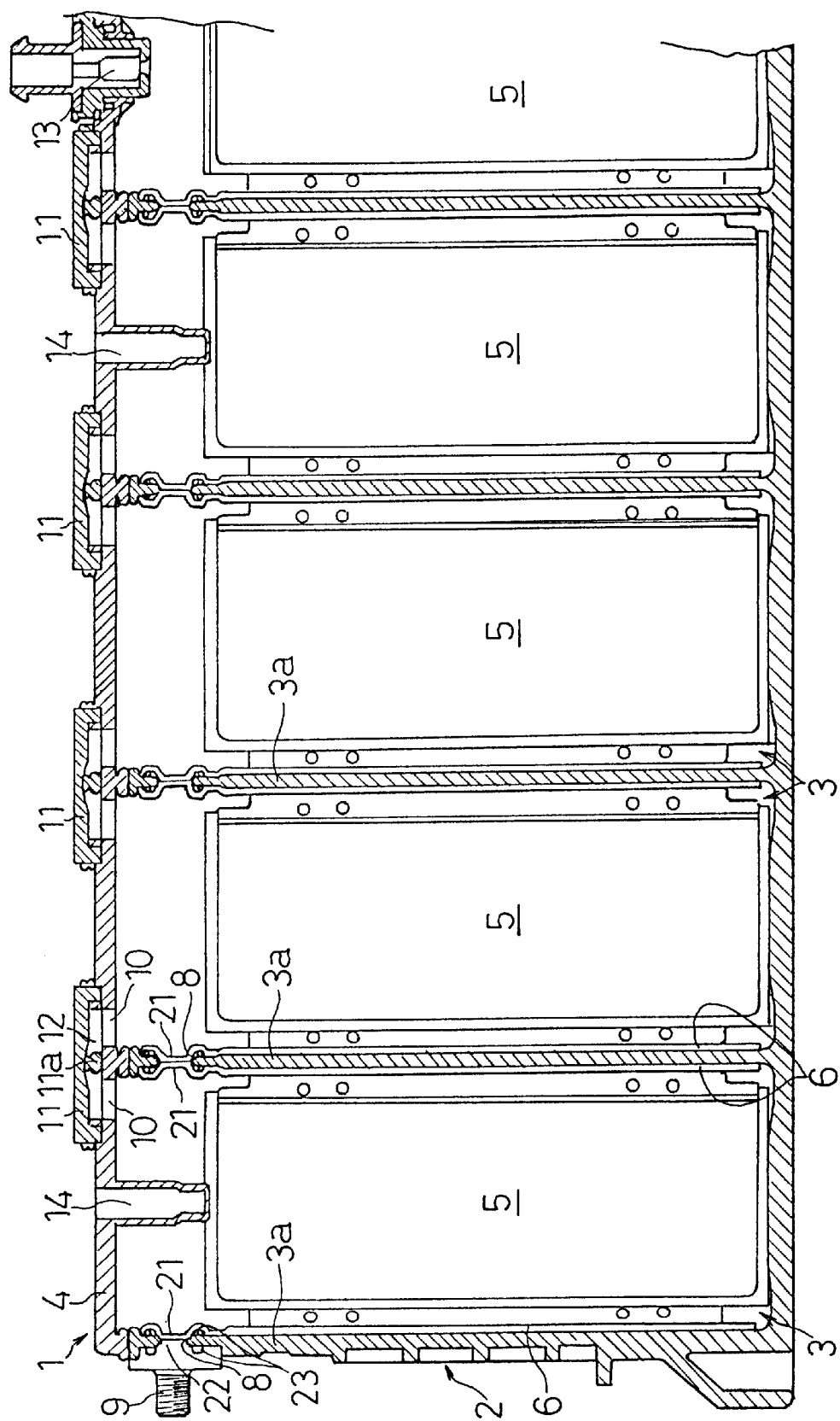
FIG. 2 is a partial longitudinal cross-sectional side view of the battery module.

The sealed rechargeable battery of this embodiment is a nickel metal hydride battery, which is suitable for use as a drive power source for an electric vehicle. As shown in FIGS. 1 and 2, a battery module 1 is made up of a plurality of (six in the example shown in the drawing) such sealed rechargeable battery cells, arranged side by side in a row. Cell cases 3 of each of the cells, which are formed in a prismatic fashion with short lateral walls 3a, long lateral walls, and open top ends, are mutually integrated on their short lateral walls 3a, thereby constituting an integral battery case 2. The upper open ends of the cell cases 3 are closed all together by an integral lid member 4.

Each of the cell cases 3 constitutes a cell 7, accommodating therein an electrode plate group 5 including collector plates 6 bonded to the opposite lateral ends of the electrode plate group 5 together with electrolyte. The electrode plate group 5 comprises a large number of positive electrode plates and negative electrode plates arranged parallel to the long lateral walls of the cell cases 3 and layered in the direction of the short lateral walls 3a of the cell cases 3, with intervening separators therebetween.

Connection holes 8 are formed at the upper edge portions of the outer short lateral walls 3a of the cell cases 3 at the two ends of the integral battery case 2 and between each two cell cases 3. Positive and negative connection terminals 9 are respectively mounted to the connection holes 8 at the outer short lateral walls 3a of the two outer cell cases 3, and connection fittings 9 for serially connecting two adjacent cells 7 are mounted to the connection holes 8 in the intermediate short lateral walls between each two cell cases 3.

On the top face of the lid member 4, through holes 10 are formed in adjacent edge portions of neighboring cell cases 3, 3. Communicating lids 11 forming communicating paths 12 for connecting two through holes 10, 10 are welded onto the lid member 4. Numeral 11a denotes reinforcing protrusions protruding from the middle of the inner wall of the communicating lids 11. The size of the reinforcing protrusions 11a is such that they do not close the communicating paths 12, and their leading ends are abutted against and welded to the top face of the lid member 4, ensuring the pressure strength of the communicating lids 11. The integrated battery case 2, the lid member 4 and the communicating lids 11 are made of a synthetic resin material, such as a PP/PPE alloy (polypropylene/polyphenylene ether alloy), and they are repellent against the electrolyte.

In addition, the lid member 4 is provided with one safety vent device 13, so as to release pressure when the internal pressure in the cell cases 3 has exceeded a certain value. The safety vent device 13 will be described later in more detail. Moreover, a sensor mounting hole 14 for mounting a temperature detection sensor for detecting the temperature of the cells 7 is formed in the cell cases 3 of suitable cells 7 such that the bottom of the sensor mounting hole contacts the upper end of the electrode plate group 5.

The long lateral walls of six cells 7 together form an integral side wall 15 of the integral battery case 2. On this side wall 15 of the integral battery case 2, protruding ribs 16 that extend vertically are provided at positions corresponding to the lateral edges of two adjacent cell cases 3. Further, a large number of relatively small circular protrusions 17 are formed at suitable intervals in matrix fashion between each two ribs 16. The ribs 16 and the protrusions 17 have the same height. Furthermore, coupling ribs 18a and 18b having the same height as the ribs 16 and the protrusions 17 are formed on the side walls of the upper edge of the cell cases 3 and the side walls of the lid member 4, such as to bridge across the side walls of the cell cases 3 and the lid member 4, at positions corresponding to an extension of the ribs 16 and the protrusions 17. When a plurality of integral battery cases 2 are arranged in a row in parallel to constitute a battery pack, the ribs 16, the protrusions 17 and the coupling ribs 18a and 18b form coolant passages for cooling the cell cases 3 effectively and uniformly.

Protrusions 19 and indentations 20, for positioning and fitting together integral battery cases 2 when their side walls 15 are abutted on each other, are arranged substantially in the middle of two given cell cases 3 positioned symmetrical with respect to the centerline in the longitudinal direction of the integral battery case 2.

The aforementioned electrode plate group 5 comprises a large number of positive electrode plates made of Ni foamed metal and negative electrode plates made of Ni punched metal coated with an active material, these electrode plates being laminated alternately, wherein the positive electrode plates are covered with separators in the form of a bag having an opening on one side. The positive electrode plates and the negative electrode plates with intervening separators therebetween thereby constitute the electrode plate unit 5. The lateral edges of the group of positive electrode plates protrude beyond the group of negative electrode plates on one side, and the lateral edges of the group of negative electrode plates protrude beyond the group of positive electrode plates on the opposite side, and collector plates 6 are welded respectively to the lateral edges of the positive and negative electrode plates.

The collector plate 6 are welded to the opposite lateral edges of the electrode plate group 5. As shown in FIG. 2, at the upper edge of a collector plate 6, a connection projection 21 is formed such as to protrude outwards. By fitting this connection projection 21 into a connection hole 8 formed at the upper edge of the short lateral wall 3a of the cell case 3, the electrode plate group 5 is fixedly positioned with respect to the cell case. As can be seen from FIG. 2, a plurality of cells 7 are arranged adjacent each other, with the connection projections 21 of the collector plates 6 being fitted in the connection holes 8 in the short lateral walls 3a of the cell cases 3 and welded together. Thereby, the electrode plate group 5 of each of the cells 7 is fixed on the short lateral walls 3a of respective cell cases 3, as well as mutual electrical connection between adjacent cells 7 is achieved.

On the outer face of the short lateral walls 3a of the cells at opposite outer ends of the battery module 1, an electrode terminal 9 is attached. The electrode terminal 9 is also provided with a connection projection 22 that can fit into the connection hole 8, so that it can be welded to the connection projection 21 of the collector plate 6. Annular grooves are formed around the connection projections 21, 22 of the collector plates 6 and the electrode terminal 9, in which O-rings 23 are fitted so as to seal the holes in the short lateral walls 3a.

Figure 3:
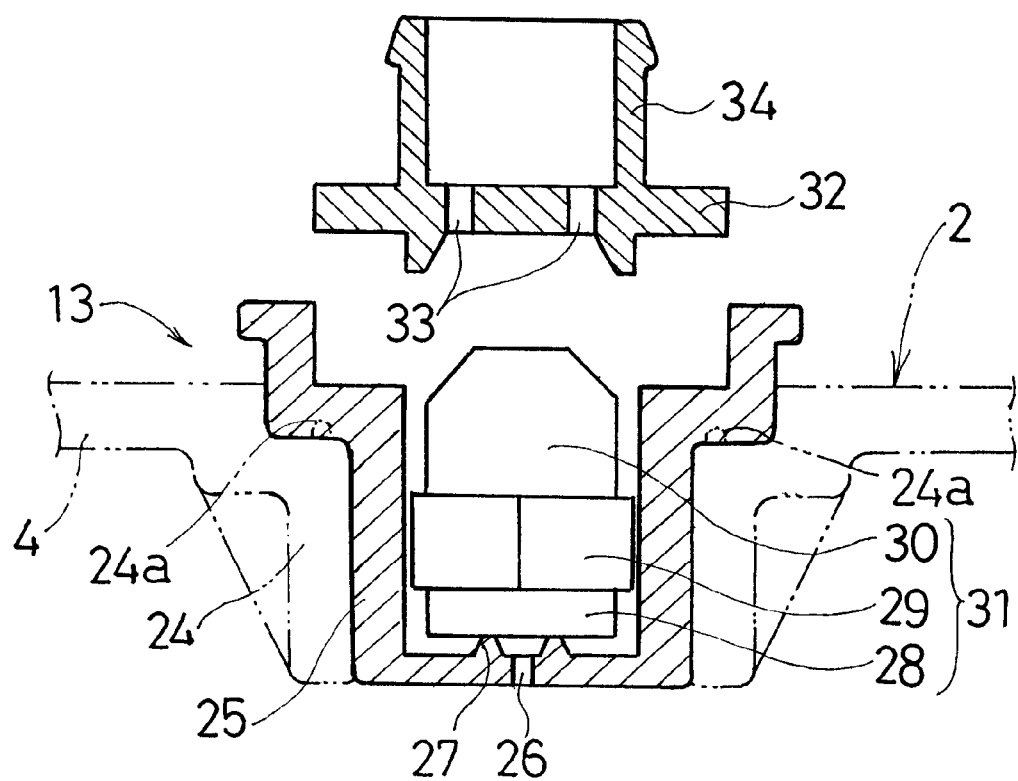
FIG. 3 is an exploded cross-sectional view of the safety vent device in the same embodiment.

Referring now to FIG. 3, the safety vent device 13 comprises a valve case 25 which is formed with a vent 26 in its bottom surface, a valve body 31 inserted within the valve case 25, and a valve cover 32 fitted in to the upper open end of the valve case 25. The safety vent device 13 is mounted in the integral battery case 2 of the battery module 1 by fitting the valve case 25 into a cylindrical, stepped mounting hole 24 formed in the upper wall of the lid member 4 and welding same thereto. A sealing projection 24a is protruded on the stepped portion of the cylindrical mounting hole 24. The vent 26 is formed in the center in the bottom of the valve case 25, and furthermore, a sealing protrusion 27 surrounding the vent 26 is formed in the upper face of the bottom wall of the valve case 25. The valve body 31 comprises a sealing portion 28 that is brought in tight contact with the sealing protrusion 27 for providing a seal, a rigid holder 29 for supporting the sealing portion 28, and a resilient portion 30 made of rubber for pressing the rigid holder 29 towards the vent 26. The valve body 31 is inserted in the valve case 25 in a state wherein the resilient portion 30 is compressed, with the upper open end of the valve case 25 being closed by fitting in and welding the valve cover 32 thereonto. Apertures 33 are formed in the valve cover 32 so as to communicate with the space formed around the valve body 31. Further, a connection port 34 to which a discharge hose is connected is formed on the valve cover 32 to extend upwards.

Figure 4:
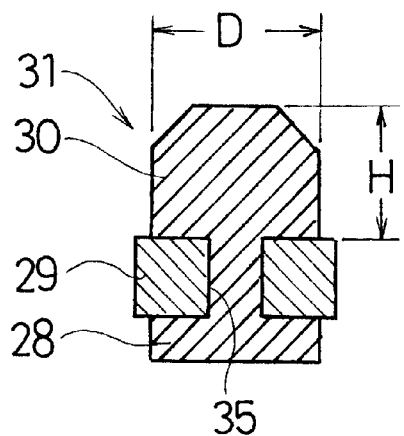
FIG. 4 is a cross-sectional view of a valve body in the same embodiment.
Figure 5:
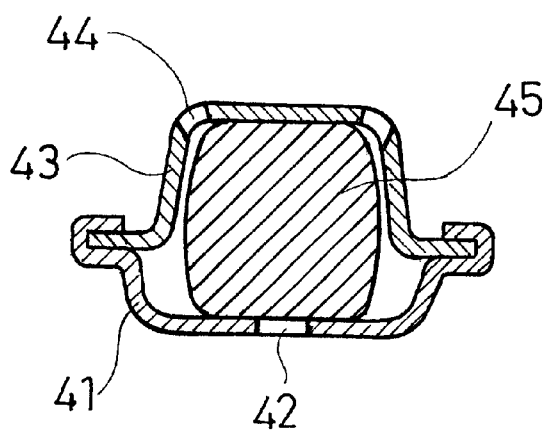
FIG. 5 is a cross-sectional view of a conventional safety vent structure.
Figure 6:
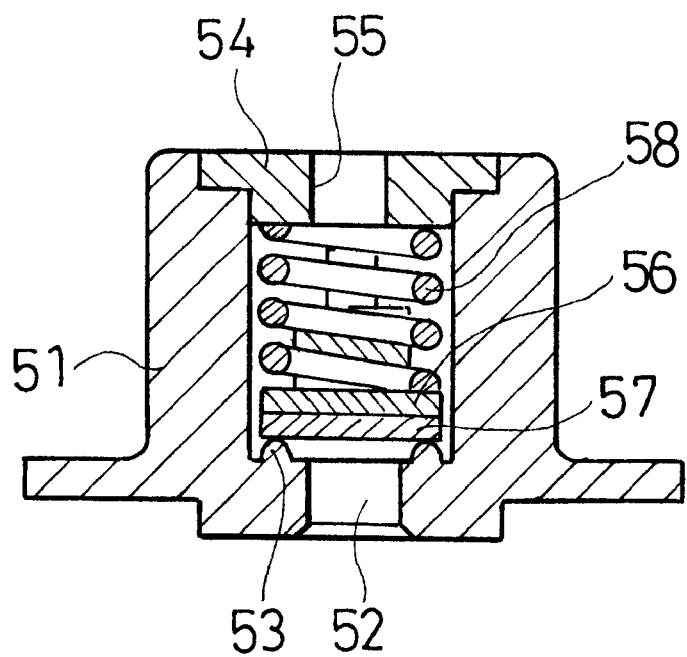
FIG. 6 is a cross-sectional view of another conventional safety vent structure.

The sealing portion 28 and the resilient portion 30 are formed integral with each other, being passed through a connection hole 35 formed in the center of the rigid holder 29 as shown in FIG. 4. The rigid holder 29 consists of a resin plate or a metal plate of square or polygonal shape, of which corners slidably engage with the inner circumferential surface of the valve case 25, so that the valve body 31 is aligned concentric with the valve case 25 in a state wherein there is a gap formed between the outer circumferential surface of the rigid holder 29 and the inner circumferential surface of the valve case 25. The height H of the resilient portion 30 is set substantially equal to or more than its dimension D in the radial direction.

In the battery module 1 of the present invention, since the neighboring cells 7 are connected within the integral battery case 2 and the connection configuration of the cells 7 is not exposed to the outside, the installation space for the battery module 1 can be made compact. Further, since the neighboring cells 7 are connected in series by welding the connection projections 21 formed on the collector plates 6 by press-molding, no additional components for connection are necessary. Therefore, the cells can be connected simply with a reduced number of components at low cost. Moreover, because the connection projections 21 are integral with the collector plates 6 and the abutted connection projections 21 are welded together at one point, the electric resistance at the connecting portions is remarkably low.

Furthermore, in the electrode plate groups 5 of the cells 7, the lateral edge portions of the group of positive electrode plates protrude beyond the group of negative electrode plates on one side, and the lateral edge portions of the group of negative electrode plates protrude beyond the group of positive electrode plates on the opposite side, and collector plates 6 are welded to these protruded lateral edge portions over their entire length. Therefore, the average distance from the surfaces of the electrode plates to the collector plates 6 can be made short, and as a result, the internal battery resistance can be made small and the utilization rate of the electrode active material becomes large, which increases the battery output.

Moreover, on the top face of the lid member 4, through holes 10 are formed in adjacent edge portions of neighboring cell cases 3, 3. Communicating lids 11 forming communicating paths 12 for connecting two through holes 10, 10 are welded onto the lid member 4. Thereby, the internal pressure between the plurality of cells can be made uniform, and it is prevented that life of particular cells 7 is decreased by partial rise in the internal pressure. Service life of the entire battery module 1 is thereby prevented from being diminished. Moreover, it is only necessary to provide a single safety vent device 13 on the lid member 4, and a further decrease in cost can be achieved.

In the safety vent device 13, the sealing portion 28 is supported by the rigid holder 29 and pressed towards the sealing protrusion 27 formed in the bottom of the valve case 25. Since the sealing portion 28 is supported by the rigid holder 29 and it makes line contact with the sealing protrusion 27, the variance in the pressure at which the vent device operates can be made smaller.

The resilient member 30 is comprised of a one-piece block and presses the rigid holder 29 stably, and thus there is no risk that the pressing force is acted unevenly even without providing a guiding mechanism as in the case where the pressing force is generated by a spring member. Therefore, the pressure acts on the entire surface of the sealing portion uniformly, whereby the pressure for providing a seal can be exerted evenly around the entire circumference of the sealing portion. Thus the safety vent device can be caused to operate suitably and stably with such a simple and inexpensive structure.

Moreover, part of the outer circumferential surface of the rigid holder 29 slidably engages with the inner circumferential surface of the valve case 25, whereby the valve body 31 is oriented concentric with the valve case 25, and precise operation of the valve body 31 can be ensured. Specifically, with such configuration, the resilient portion 30 or the sealing portion 28 of the valve body 31 can be prevented from touching the valve case 25 even at high temperatures when the rubber-made valve body 31 tends to expand, whereby the safety vent device can operate stably even when the ambient temperature is high.

Furthermore, because the height H of the resilient portion 30 of the valve body 31 is set substantially equal to or more than its dimension D in the radial direction, variations in the compression of the resilient portion 30 can be readily accommodated and the pressing force exerted on the sealing portion can be stabilized, whereupon the variance in the pressure at which the vent device operates can be made smaller.

The safety vent device of the present invention basically comprises three components, i.e., the valve case 25, valve body 31, and valve cover 32, and it can be fabricated with such a reduced number of components and a simple structure at low cost. Moreover, the sealing portion 28 and the resilient portion 29 are in fact formed integral with each other through the connection hole 35 in the rigid holder 29, which means the valve body 31 is comprised of a single component fabricated in a single manufacture process. Thereby, the structure of the safety vent device can be further simplified and the cost reduced.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A safety vent device provided in a wall of a sealed rechargeable battery, comprising:
   a vent that communicates with an interior of the rechargeable battery through the wall;
   a sealing protrusion formed around said vent; and
   a valve body for closing the vent, including a sealing portion that is in tight contact with the sealing protrusion, a rigid holder for supporting said sealing portion, and a one-piece block resilient portion for pressing said rigid holder towards said vent.

2. A safety vent device provided in a wall of a sealed rechargeable battery, comprising:
   a vent that communicates with an interior of the rechargeable battery through the wall;
   a sealing protrusion formed around said vent;
   a valve body for closing the vent, including a sealing portion that is in tight contact with the sealing protrusion, a rigid holder for supporting said sealing portion, and a resilient portion for pressing said rigid holder towards said vent;
   a valve case, which is fixedly mounted in the wall of the rechargeable battery, and in which said vent and said sealing protrusion are formed in a bottom of the valve case; and
   a valve cover formed with apertures for closing said valve case with said valve body housed inside the valve case in a state, wherein said resilient portion of said valve body is compressed between said rigid holder of the valve body and said valve cover.

3. A safety vent device according to claim 2, wherein the rigid holder is formed with a connection hole, and the sealing portion and the resilient portion are formed integral with each other, and pass through said connection hole in the rigid holder.

4. A safety vent device according to claim 2, wherein the resilient portion has a height substantially equal to or more than a dimension of the resilient portion in a radial direction.

5. A safety vent device according to claim 2, wherein an outer circumferential surface of the rigid holder and an inner circumferential surface of the valve case form a gap therebetween, and the valve body is positioned concentric with the valve case, with part of the outer circumferential surface of the rigid holder being engaged with the inner circumferential surface of the valve case.

6. A safety vent device according to claim 2, wherein said valve case has a stepped side portion.

7. A safety vent device according to claim 2, wherein said valve cover includes a connection port for connection to a discharge hose.

8. A safety vent device according to claim 2, wherein the resilient portion is a one-piece block.

9. A sealed rechargeable battery comprising:
   a plurality of positive electrode plates and a plurality of negative electrode plates laminated alternately upon one another with intervening separators, thereby constituting an electrode plate group;
   collector plates respectively connected to the plurality of positive electrode plates and negative electrode plates;
   a battery case for accommodating the electrode plate group and the collector plates together with an electrolyte in a sealed state; and
   a safety vent device for releasing pressure when the pressure inside the battery has reached a predetermined value, wherein the safety vent device includes:
      a valve case which is fixedly mounted in a wall of the rechargeable battery, and in which a vent that communicates with the interior of the rechargeable battery and a sealing protrusion protruded around said vent are formed in the bottom thereof,
      a valve body including a sealing portion that is in tight contact with said sealing protrusion, a rigid holder for supporting said sealing portion, and a resilient portion for pressing said rigid holder towards said vent, and
      a valve cover formed with apertures for closing said valve case with said valve body housed inside the valve case in a state wherein said resilient portion of said valve body is compressed between said rigid holder of the valve body and said valve cover.

10. A sealed rechargeable battery according to claim 9, wherein the rigid holder is formed with a connection hole, and the sealing portion and the resilient portion are formed integral with each other, and pass through said connection hole in the rigid holder.

11. A sealed rechargeable battery according to claim 9, wherein the resilient portion has a height substantially equal to or more than a dimension of the resilient portion in a radial direction.

12. A sealed rechargeable battery according to claim 6, wherein said valve case has a stepped side portion.

13. A sealed rechargeable battery according to claim 6, wherein said valve cover includes a connection port for connection to a discharge hose.

14. A sealed rechargeable battery according to claim 9, wherein an outer circumferential surface of the rigid holder and an inner circumferential surface of the valve case form a gap therebetween, and the valve body is positioned concentric with the valve case, with part of the outer circumferential surface of the ridge holder being engage with the inner circumferential surface of the valve case.

15. A sealed rechargeable battery according to claim 9 wherein the resilient portion is a one-piece block.

16. A vent device for a sealed battery comprising:
a vent structure in a wall of the sealed battery defining a cavity and a vent hole communicating with an interior of the sealed battery;
a valve body displaceably disposed in the cavity, the valve body including:
  a sealing portion for sealing the vent hole;
  a rigid holder having a first side for supporting the sealing portion against the vent hole, and a second side opposite the first side; and
  a one-piece block resilient portion connected to the second side of the rigid holder; and
the vent structure including a cover structure for applying pressure to the one-piece block resilient portion such that deformation of the one-piece block resilient portion applies a biasing force to the sealing portion to bias the sealing portion against the vent hole to effect sealing thereof, and for permitting escape of gas which passes through the vent hole when gas pressure exceeds the biasing force.

17. The vent device of claim 16 wherein the cover structure is formed separately from the vent structure and connected thereto.

18. The vent device of claim 17 wherein the vent hole is surrounded by an annular protrusion which engages the sealing portion to effect sealing.

19. The vent device of claim 16 wherein the rigid holder has an outer circumferential diameter greater than diameters of the resilient portion and the sealing portion, and the outer circumferential diameter permitting sliding engagement of the rigid holder with an interior surface of the cavity.

20. The vent device of claim 19 wherein the vent hole is surrounded by an annular protrusion which engages the sealing portion to effect sealing.

21. The vent device of claim 18 wherein the rigid holder has an outer circumferential diameter greater than diameters of the resilient portion and the sealing portion, and the outer circumferential diameter permitting sliding engagement of the rigid holder with an interior surface of the cavity.

22. A vent device for a sealed battery comprising:
a vent structure in a wall of the sealed battery defining a cavity and a vent hole communicating with an interior of the sealed battery-;
a valve body displaceably disposed in the cavity, the valve body including:
  a sealing portion for sealing the vent hole;
  a rigid holder having a first side for supporting the sealing portion against the vent hole, and a second side opposite the first side; and
  a resilient portion connected to the second side of the rigid holder; and
the vent structure including a cover structure for applying pressure to the resilient portion such that deformation of the resilient portion applies a biasing force to the sealing portion to bias the sealing portion against the vent hole to effect sealing thereof, and for permitting escape of gas which passes through the vent hole when gas pressure exceeds the biasing force, wherein the cover structure is formed separately from the vent structure and connected thereto, the vent hole is surrounded by an annular protrusion which engages the sealing portion to effect sealing, and the resilient portion and the sealing portion are integrally formed.

23. The vent device of claim 22, wherein the resilient portion is a one-piece block.

* * * * *